United States Patent [19]

Nishioka et al.

[11] Patent Number: 4,618,983
[45] Date of Patent: Oct. 21, 1986

[54] SPEECH RECOGNITION WITH PRELIMINARY MATCHING

[75] Inventors: Yoshiki Nishioka, Tenri; Mitsuhiro Hakaridani, Nara; Hiroyuki Iwahashi, Tenri, all of Japan

[73] Assignee: Sharp Kabushiki Kaisha, Osaka, Japan

[21] Appl. No.: 452,298

[22] Filed: Dec. 22, 1982

[30] Foreign Application Priority Data

Dec. 25, 1981 [JP] Japan ................................ 56-210605

[51] Int. Cl.⁴ .............................................. G10L 5/00
[52] U.S. Cl. ...................................................... 381/43
[58] Field of Search ..................................... 381/42–43; 364/513, 513.5

[56] References Cited

U.S. PATENT DOCUMENTS

4,277,644 7/1981 Levinson et al. ...................... 381/43
4,400,788 8/1983 Myers et al. ........................... 381/43

Primary Examiner—E. S. Matt Kemeny
Attorney, Agent, or Firm—Birch, Stewart, Kolasch and Birch

[57] ABSTRACT

Speech recognition executes the final matching operation for each characteristic pattern according to the preliminarily selected order prior to the final matching, where any further calculation in reference to such a characteristic pattern is not executed after a specific condition has been satisfied during the matching calculation, and as result, calculation requirements can be drastically minimized so that the speech recognition can eventually be implemented at higher speed and yet under a sharply reduced cost.

8 Claims, 7 Drawing Figures

FIG. 3A
PRELIMINARY SELECTION

FIG. 3B
MAIN SELECTION

SPEECH RECOGNITION WITH PRELIMINARY MATCHING

BACKGROUND OF THE INVENTION

The present invention relates to means for recognizing speech. More particularly, it relates to a speech recognition system that enables characteristic patterns of the recognizable speech to be properly compared with the characteristic patterns of a plurality of previously registered speech patterns before both a match is obtained.

Conventional, speech recognition systems perform a matching operation using a DP matching method in relation to the characteristic patterns of the individual speech and the characteristic patterns of a plurality of the preliminarily registered individual speech patterns is carried out so that the speech can eventually be recognized in accordance with the result of carrying out the matching operation.

Nevertheless, if all the characteristic patterns of a plurality of the preliminarily registered individual speeches must be tested, either vastly complex calculations or high speed hardware will be necessary, and as a result, such a huge system becomes too costly.

To eliminate such an inconvenience, a proposal suggests to use either a so-called "preliminary selection" or an advance reference so as to limit the number of tests for the recognizable object by preliminarily selecting for comparison the easily calculatable patterns while using the DP matching method before.

Although such a preliminary selection can minimize the calculation requirements in the final matching operation, there is a constant demand for realizing a still more effective speech recognizing system capable of drastically minimizing such calculation requirements as well as the cost associated with these calculations.

SUMMARY OF THE INVENTION

In the light of such a prevailing demand, using a speech recognition method that performs preliminary selections, the present invention primarily aims to provide a speech recognition system that can satisfactorily meet the demand mentioned above.

In summary, the present invention provides a preliminary matching operation in advance of the final matching needed for eventually recognizing the characteristic patterns. In the embodiment of the present invention, more than one of the characteristic patterns of speech are preliminarily selected out of the characteristic patterns of a plurality of the preliminary registered speeches such that the first pattern is the one that is presumably closest in position with in respect to its similarity to the actual characteristic patterns of the speech that is to be recognized.

Next, the parameter that correlates with the similarity between each characteristic pattern is calculated according to the sequence that has preliminarily been selected. As soon as a specific condition has been satisfied after completing the parameter calculation, any further calculation needed for the corresponding characteristic pattern is then discontinued so that the calculation requirements can effectively be minimized.

BRIEF DESCRIPTION OF THE DRAWING

The primary object and still further objects and the features of the present invention described above will be clarified furthermore by the detailed description of the present invention in reference to the drawings, shown below.

DETAILED DESCRIPTION OF THE INVENTION

Figure 1:
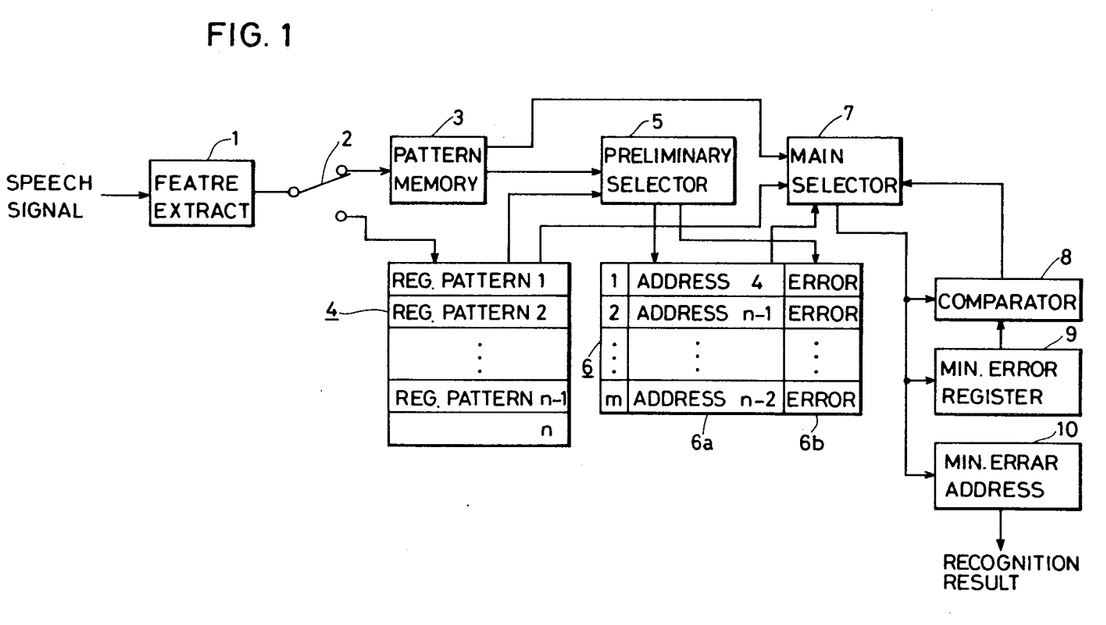
FIG. 1 shows a block diagram of a preferred embodiment of the present invention, FIG. 2 drawings A and B respectively show the flow charts describing sequential operations of a preferred embodiment of the present invention shown in FIG. 1, FIG. 3 drawings A and B respectively show the chart illustrating the matching operations performed by the preliminary and the final selection units 5 and 7 shown in FIG. 1.

FIG. 1 shows a block diagram of a preferred embodiment of the present invention. In the preferred embodiment, a speech signal is fed to the characteristic pattern extraction circuit 1 which extracts the characteristics of the speech signal upon arrival by using, for example, the coefficient of the auto correlation. The output from the characteristic pattern extraction circuit 1 is fed to the mode select switch 2, which, by switching its contact point, feeds the output from the characteristic pattern circuit 1 to the pattern memory 3 when the speed identifying operation is performed, while said output is fed to the pattern memory 4 when the characteristic patterns are being registered.

The pattern memory 3 has a memory capable of memorizing the characteristic output corresponding to at least one word, i.e., the characteristic pattern, which is fed from the characteristic pattern extraction circuit 1.

Characteristic patterns of n-kinds of individual speech are preliminarily registered by the register table 4.

The characteristic patterns read out from the pattern memory 3 and register table 4 are respectively fed to the preliminary selector 5.

The preliminary selector 5 performs a preliminary matching between the characteristics patterns fed from the pattern memory 3 and register table 4, while the result is memorized by the preliminary selection table 6 comprising ($<$n) unit of the address area 6a and matching error area 6b. The address area 6a memorizes addresses in the register table 4 for such registered patterns which have been previously selected by the preliminary selector 5.

The matching error area 6b memorizes any error in the result of the matching operation between the characteristic patterns fed from the pattern memory 3 which are selected by the preliminary selector 5 and the other characteristic patterns fed from the register table 4.

The preliminary selector 5 shifts the alignment of the address and matching error in such an order as beginning with the one having the least error.

Method of the matching operations performed by the preliminary selector 5 is described below.

There are a wide variety of the matching means available. For example, one such matching means uses a characteristic parameter including the length of individual words and spectrum either in the head or end portion of such words Refer to the "Report on the studies of the general purpose speech recognizer" (publishing in March, 1979), chapter 5. An alternative matching means may also be applied, which first extracts about 10 points from the characteristic vector time sequence at the same intervals in order to create approximately 50 dimensional pattern vectors, then a linear sampling reference is used to limit the number of the recognizable objects up to a maximum of 20%. Refer to the "Paper on the results of researches for a large-scale project pattern data processing system", which was published by a Japanese corporation, the Nihon Sangyo Gijutsu Shinko Kyokai, in October, 1979, pages 157 through 165.

As another preferred means, an invented technique may also be used, which was previously proposed and embodied by a preceding invention and eventually disclosed by the Patent Office of Japan under the disclosure number TOKUSHOKAI 56-144449. There is a corresponding co-pending application for this preceeding invention, U.S. application Ser. No. 414,956.

Said technique is particularly effective and suitable for applying the coefficient of the auto correlation when extracting speech characteristics. Of a variety of the coefficient of the auto correlations typically represented by the high dimensional vector alignment, said technique executes a linear matching by means of the low dimensional coefficient of correlation.

A still further embodiment of the present invention for executing such a preliminary matching operation would utilize a simplified version of the extremely complex algorithm that is to be applied to the final matching operation.

Using such a simplified calculation algorithm, a so-called rough calculation, may be performed.

Characteristic patterns read out of the pattern memory 3 and the other characteristic patterns read out of the register table 4 are respectively fed to the main selector 7, while the addresses of the register table 4 memorized by the preliminary selector table 6 are sequentially fed to the main selector 7.

In compliance with the addresses of the register table 4 fed from the preliminary selector table 6, the main selector 7 reads out characteristic patterns corresponding to the register table 4, then executes the final matching operation with the characteristic patterns stored in the pattern memory 3 in a frame by frame manner. Each frame represents the length of a calculation period for the function, for example, an auto-correlative function that represents a characteristic pattern. For example, such a frame is set in a range from 8 to 30 microseconds. Any erroneous element from the matching detected during the final matching operation is fed to the comparative circuit 8 and also to the minimum error register 9. The main selector 7 controls re-writing operation of the minimum error register 9 so that the least error from the matching so far detected can be memorized by the minimum error register 9. Said least error element memorized by the minimum error register 9 is fed to the comparative circuit 8, which then compares the matching error fed from the main selector 7 to the matching error memorized by the minimum error register 9 after the matching operation for each individually registered pattern is completed, then feeds the result to the main selector 7, which, in responding to the result received, controls the matching operation.

The main selector 7 then reads out the address of the registered characteristic pattern corresponding to the matching error memorized by the minimum error register 9, from the preliminary selector table 6. The main selector 7 then sends said address to the minimum error address register 10.

Figure 2A:
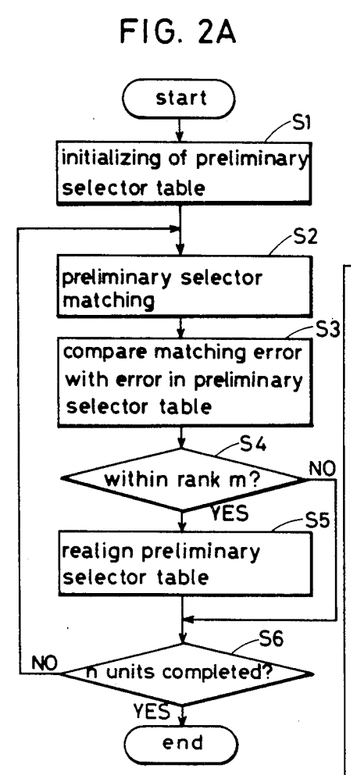

FIGS. 2A and B respectively show the flow charts describing the operation performed by both the preliminary and main selectors 5 and 7 shown in FIGS. 1. FIG. 3A and B respectively show flow charts describing the matching operations performed by both the preliminary and main selectors 5 and 7 shown in FIG. 1.

Figure 4:
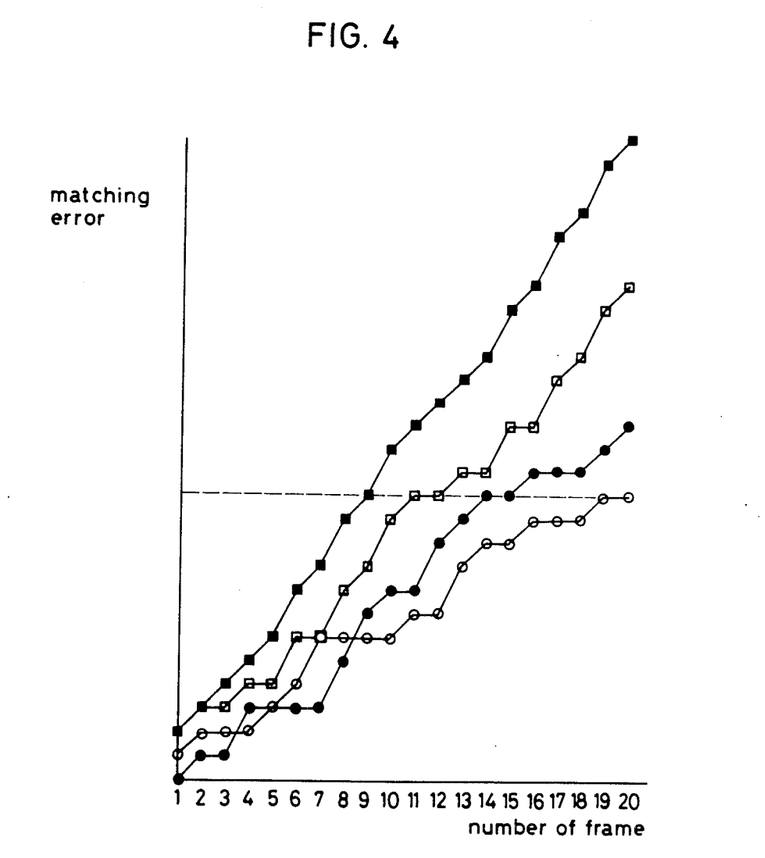
FIG. 4 shows differential curves during the matching operation using the final selection unit 7.

FIG. 4 shows a graph representing the differences of the matching effect between each of the registered characteristic patterns detected by the main selector 7.

In reference to either FIG. 2-A or FIG. 4, the operation of a preferred embodiment of the present invention shown in FIG. 1 is described below.

First, in reference to FIG. 2-A, operations of the preliminary selector 5 is described below.

During step 1 shown in FIG. 2-A (step is abbreviated as S in the drawing), an initial state of the preliminary selector table 6 is entered.

During this stage, the entire addresses memorized by the address area 6a are cleared, whereas any error of the matching result memorized by the matching error area 6b is re-written into the maximum matching error. Said maximum matching error represents the largest matching error that are memorized by the matching error area 6b.

During step 2, a matching operation for the preliminary selection is executed. Any matching error detected by step 2 is then compared to all of the matching errors stored in the preliminary selector table 6 during the ensuing step 3. During step 4, an operation is executed in order to identify whether the matching error detected by the preliminary selector 5 is within the 3rd rank of the matching error, or not. In other words, it is identified whether or not the matching error detected by the preliminary selector 5 remains within the 3rd rank from the one having the least matching error in the preliminary selector table 6. If it is within the 3rd rank, the detected error and the address of the registered characteristic pattern corresponding to said matching error are then fed to the preliminary selector table 6 during the next step 5.

Then, both the matching error stored in the preliminary selector table 6 and the corresponding address are then re-aligned in such an order as beginning from the one having the least error in the matching operation.

As a result, both the matching error having the largest value and its corresponding address stored in the preliminary selector table 6 are eventually eliminated from it. Instead, a matching error fed from the preliminary selector table 6 and the corresponding address are written into said table 6.

During step 6, it is identified whether the matching operation for the n-th registered characteristic pattern stored in the register table 4 is completed, or not. In other words, it is identified whether the matching of all the characteristic patterns stored in the registered table 4 is completed, or not.

If it is identified that the n-th registered characteristic pattern has not yet been matched exactly, procedures beyond the step 2 are repeatedly executed.

As shown in FIG. 3-A, the input characteristic pattern memorized by the pattern memory 3 and n units of the registered characteristic pattern R1 or Rn of the registered table 4 are sequentially matched.

As shown as the input characteristic pattern and the fully registered characteristic pattern of the register table 4 have correctly matched each other, the preliminary selector table 6 ought to memorize m units of the matching error in such an order as starting from the least error on, and all of such details are detected by the preliminary selector 5 and address corresponding to said m unit of the matching error.

Figure 2B:
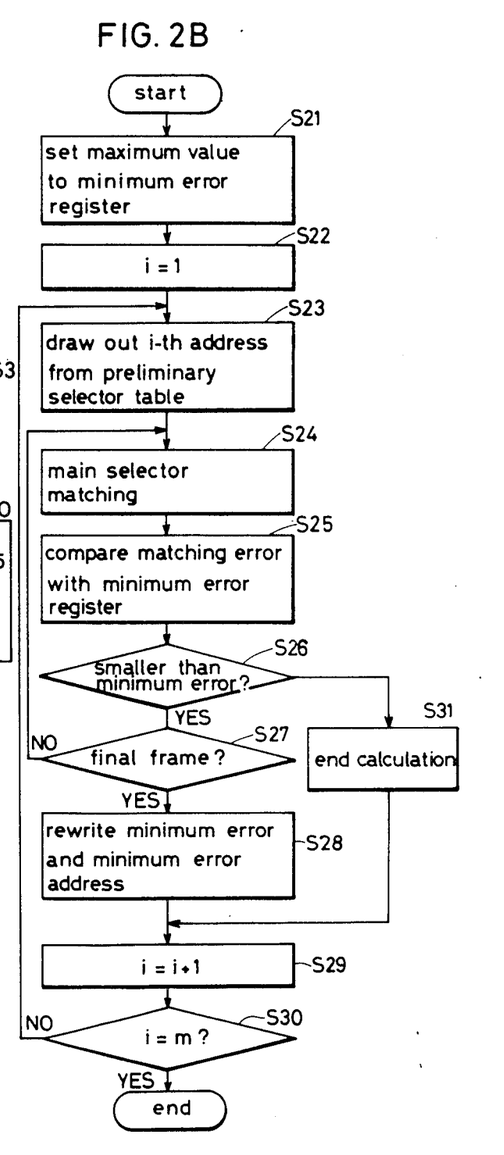
Figure 3A:
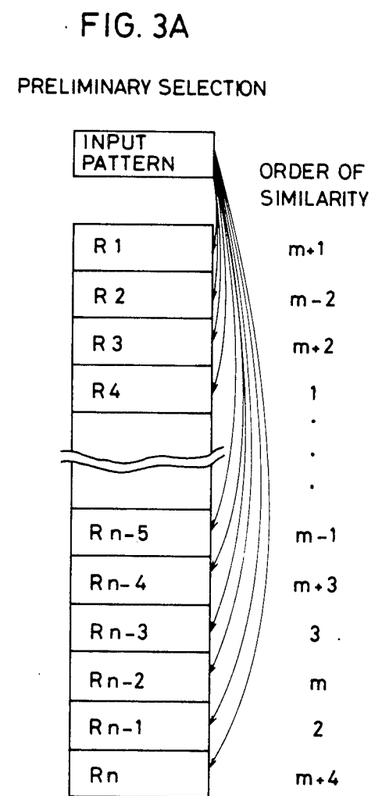
Figure 3B:
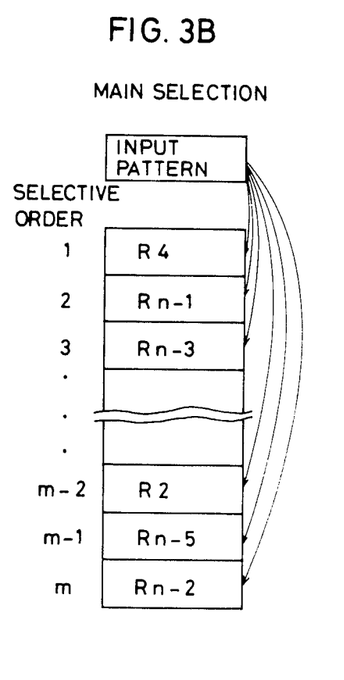

As soon as the preliminary selector 5 has completed its operation, the main selector 7 operates in accordance with the flow chart shown in FIG. 2-B.

In other words, the main selector 7 sets the minimum error register 9 in its maximum value during the step 21. Such a maximum value represents a maximum of the matching error memorized by the minimum error register 9. A value one is set in the counter 1 (not illustrated) during the step 22 operation. The counter 1, for example, is included in the main selector table 7 and calculates the number of the registered characteristic patterns which have been treated by the matching operation executed by the main selector 7.

During the next step 23, the first address is read out of the preliminary selector table 6. The value 1 is designated by the result calculated by said counter 1.

During the next step 24, the registered characteristic pattern corresponding to the address read out during the preceding step 23 is then read out of the register table 4 and brought to the main selector, 7 for matching with the input characteristic pattern.

As shown in FIG. 4, the matching operation is sequentially and cumulatively executed in a frame by frame manner with of the characteristic pattern. As a result, the higher the number of the frames in a completed the matching operation, the more matching errors will remain, and the matching error shown in the last frame becomes the total of the matching error for the characteristic pattern being matched.

During the next step 25, the cumulative matching error shown in the existing frame and the matching error that is memorized by the minimum error register 9 are compared to each other. Then, during the next step 26, it is identified whether or not the cumulative matching error shown in the existing frame is less than the other matching error memorized in the minimum error register 9.

If the cumulative matching error in the existing frame is less than the matching error that is memorized by the minimum error register 9, the ensuing step 27 then identifies whether or not the matching operations for the entire frames have been completed. If the matching operations for the entire frames are not yet complete, procedures performed by the step 24 onward will be repeatedly executed.

If the next step 27 identifies that the matching operations for the entire frames are completed, then during the next step 28, both the minimum error register 9 and the minimum error address register 10 are re-written with the addresses corresponding to the detected matching errors.

The next step 29 adds 1 to i and the ensuing step 30 identifies whether or not i is greater than m. If i is smaller than m, the main selector 7 has not yet completed the matching operations for all the preliminarily selected fully registered characteristic patterns, and procedures performed by step 23 onward will be repeatedly executed.

Referring to either A or D of the matching error curves shown in FIG. 4, assume that the eventual matching error X in the matching error curve A is memorized by the minimum error register 9. In such a case, while any matching error shown in the matching error curve B is being calculated, the 14th frame will exceed the matching error X of the minimum error register 9. This can be identified by the step 26. As a result, during step 31, a matching calculation for the registered characteristic pattern which is the target of the matching operation, is then discontinued. In the same manner, all the matching calculations beyond the 11th frame is discontinued in the matching error curve C, while the matching calculations beyond the 9th frame are also discontinued in the matching error curve D. By discontinuing the matching calculation, the calculation requirements during the final selection can be minimized.

Upon completion of the matching operations using the preliminarily selected registered characteristic patterns by the main selector, the minimum error address register 10 stores the memorized address containing the smallest matching error for all of patterns. As a result, this address is output as the recognition result.

Figure 5:
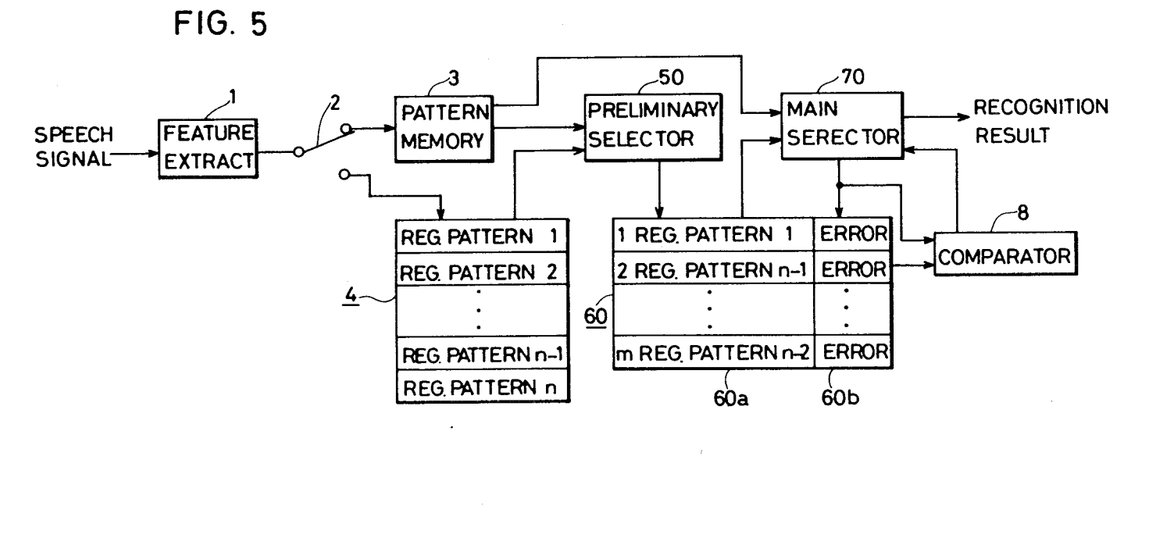
FIG. 5 shows a block diagram of another embodiment of the present invention.

FIG. 5 shows a block diagram of another preferred embodiment of the present invention. With regard to its configuration, this embodiment is identical to the preferred embodiment shown in FIG. 1 except the following functions. All the corresponding parts are provided with reference numbers identical to FIG. 1, and therefore, descriptions related to these are deleted.

As with the preliminary selector 5 shown in FIG. 1, the preliminary selector 50 shown in FIG. 5 selects m units of the registered characteristic patterns from n units of the registered characteristic patterns stored in the register table 4. Nevertheless, the preliminary selector 50 replaces the alignment of the registered characteristic patterns themselves in such an order, that begins with the one having the least matching error and feeds these data to the pattern area 60a of the preliminary selector table 60. In other words, the pattern area 60a in the preliminary selector 60 memorizes the registered characteristic patterns. themselves in place of the addresses of the registered characteristic patterns.

The main selector 70 sequentially matches the input characteristic patterns fed from the pattern memory 3 and the registered characteristic patterns stored in the pattern area 60a, and then correctly calculates the matching error.

The result is then fed to the matching error area 60b that corresponds to the preliminary selector table 60. The main selector 70 provides the comparative circuit 8 with the matching error that can be cumulatively sought in order of the frames and also provides said comparative circuit 8 with the least matching error by reading it out of the memory of the matching error area 60b.

The comparative circuit 8 outputs an instruction to the main selector 70 as soon as the matching error cumulatively given in a frame by frame manner, has exceeded the least matching error fed from the matching error area 60b.

In responding to this output from the comparative circuit 8, the main selector 70 discontinues the matching operation for the existing registered characteristic patterns.

Thus, as soon as the matching operation with the m units of the preliminarily selected registered characteristic pattern is completed, the main selector 70 then reads out the registered characteristic patterns (or their addresses) corresponding to the least matching error memorized by the matching error area 60b, and then eventually outputs the read-out patterns as the result of the recognition.

In the preferred embodiments described above, matching operations are executed in accordance with the matching error detected, the present invention also includes substitutive means having a close similarity to the preferred embodiments, and based on such a close similarity, matching operations may also be executed.

In this case, where a variety of patterns are tested for similarity, on the overall basis of the similarity that is cumulatively available in a frame by frame calabration and, if such a similarity between the registered pattern and a pattern to be recognized is found to be less than the similarity of one that represents a maximum of the similarity, then the remaining calculations seeking for the similarity of that registered characteristic patterns may be instantly discontinued.

The invention being thus described, it will be obvious that the same may be varied in many ways. Such variations are not be regarded as a departure from the spirit and scope of the invention, and all such modifications are intended to be included within the scope of the following claims.

What is claimed is:

1. A method of recognizing audible speech made up of a plurality of speech patterns comprising:
   (a) providing a plurality of reference speech patterns, each said reference speech pattern being divided into a predetermined number of feature frames;
   (b) introducing a speech signal including at least one speech pattern to be recognized;
   (c) dividing said speech pattern to be recognized into said predetermined number of feature frames, said frames of said speech pattern to be recognized corresponding in time to said frames of each said reference pattern;
   (d) comparing said speech pattern to be recognized to said reference pattern, in only a portion of said predetermined number of feature frames to determine a coarse indication of relative correlation therebetween;
   (e) ranking said reference patterns as to relative degree of correlation with speech patterns to be recognized as represented by said coarse indication developed by said step of comparing, the highest ranking indicating the highest coarse indication of related correlation;
   (f) determining a final degree of correlation between only the highest ranked of said reference patterns and said speech pattern to be recognized to determine which reference pattern corresponds to said speech pattern to be recognized.

2. A method of recognizing audible speech made up of a plurality of speech patterns comprising:
   (a) providing a plurality of reference speech patterns, each said reference speech pattern being divided into a predetermined number of features;
   (b) introducing a speech signal including at least one speech pattern to be recognized;
   (c) dividing said speech pattern to be recognized into a number of feature frames;
   (d) comparing only a portion of said speech patterns to be recognized to said reference portion patterns to determine a coarse indication of relative correlation therebetween;
   (e) ranking said reference patterns as to relative degree of correlation with speech patterns to be recognized as represented by said course indication developed by said step (d), the highest ranking indicating the highest coarse indication of relative correlation;
   (f) storing a plurality of said reference patterns having the highest rankings as indicated by said coarse indications of relative correlation in a memory in order of their ranking;
   (g) storing a threshold similarity value;
   (h) correlating each said ranked reference pattern to said speech pattern to be recognized and developing a calculated similarity value indicative of the correlation therebetween;
   (i) comparing said stored threshold similarity value with said calculated similarity value;
   (j) replacing said stored similarity value with said calculated similarity value to develop a new stored similarity value if said calculated similarity value indicates greater correlation than said stored similarity value;
   (k) discarding each said ranked reference pattern as a possible recognized pattern when its calculated similarity value indicates a lower degree of correlation than said stored similarity value;
   (l) repeating said steps h-k for each said ranked reference pattern stored in said memory to determine which reference pattern corresponds to said speech pattern to be recognized.

3. A method of recognizing audible speech made up of a plurality of speech patterns comprising:
   (a) providing a plurality of reference speech patterns, each said reference speech pattern being divided into a predetermined number of feature frames;
   (b) introducing a speech signal including at least one speech pattern to be recognized;
   (c) dividing said speech pattern to be recognized into said predetermined number of feature frames, said frames of said speech pattern to be recognized corresponding in time to said frames of each said reference pattern;
   (d) comparing said speech pattern to be recognized to said reference patterns in only a portion of said predetermined number of feature frames to determine a coarse indication of relative correlation therebetween;
   (e) ranking said reference patterns as to relative degree of correlation with the speech pattern to be recognized, as represented by said coarse indication developed by said step of comparing, the highest ranking indicating the highest coarse indication of relative correlation;
   (f) storing a plurality of said reference patterns having the highest rankings as indicated by said coarse indications of relative correlation in a memory in order of their ranking;
   (g) storing a threshold similarity value;
   (h) correlating a said ranked reference pattern to said speech pattern to be recognized and developing a calculated similarity value indicative of the correlation therebetween;
   (i) comparing said stored threshold similarity value with said calculated similarity value;
   (j) replacing said stored similarity value with said calculated similarity value to develop a new stored similarity value if said calculated similarity value indicates greater correlation than said stored similarity value;
   (k) discarding each said ranked reference pattern as a possible recognized pattern when its calculated similarity value indicates a lower degree of correlation then said stored similarity value;

(l) repeating said steps h-k for each said ranked reference pattern stored in said memory to determine which said ranked reference pattern corresponds to the introduced speech pattern to be recognized.

4. The method of claim 3 further comprising executing final recognition of said introduced speech pattern to be recognized by outputting the reference pattern associated with threshold similarity value that is stored after all of said ranked reference patterns stored in memory are compared thereto.

5. The method of claim 3 wherein said steph h comprises the steps of:

(h1) determining a frame similarity value indicative of the correlation between a frame of the said ranked reference pattern and a corresponding frame of said speech pattern to be recognized;

(h2) accumulating said frame similarity values to develop said calculated similarity value;

(h3) repeating steps h1 and h2 until said calculated similarity value either indicates that said similarity is lower than said stored threshold similarity value or until all said frames have a frame similarity value calculated therefor.

6. The method of claim 3 wherein said ranked reference pattern is discarded by step k as soon as sufficient frames have been correlated to demonstrate that said ranked reference pattern will have a lower calculated similarity than the degree of similarity represented by said stored similarity value.

7. The method of claim 3 wherein said similarity values are directly related to the degree of similarity.

8. The method of claim 3 wherein said similarity values are directly related to the degree of matching error.

* * * * *